United States Patent Office 3,245,253
Patented Apr. 12, 1966

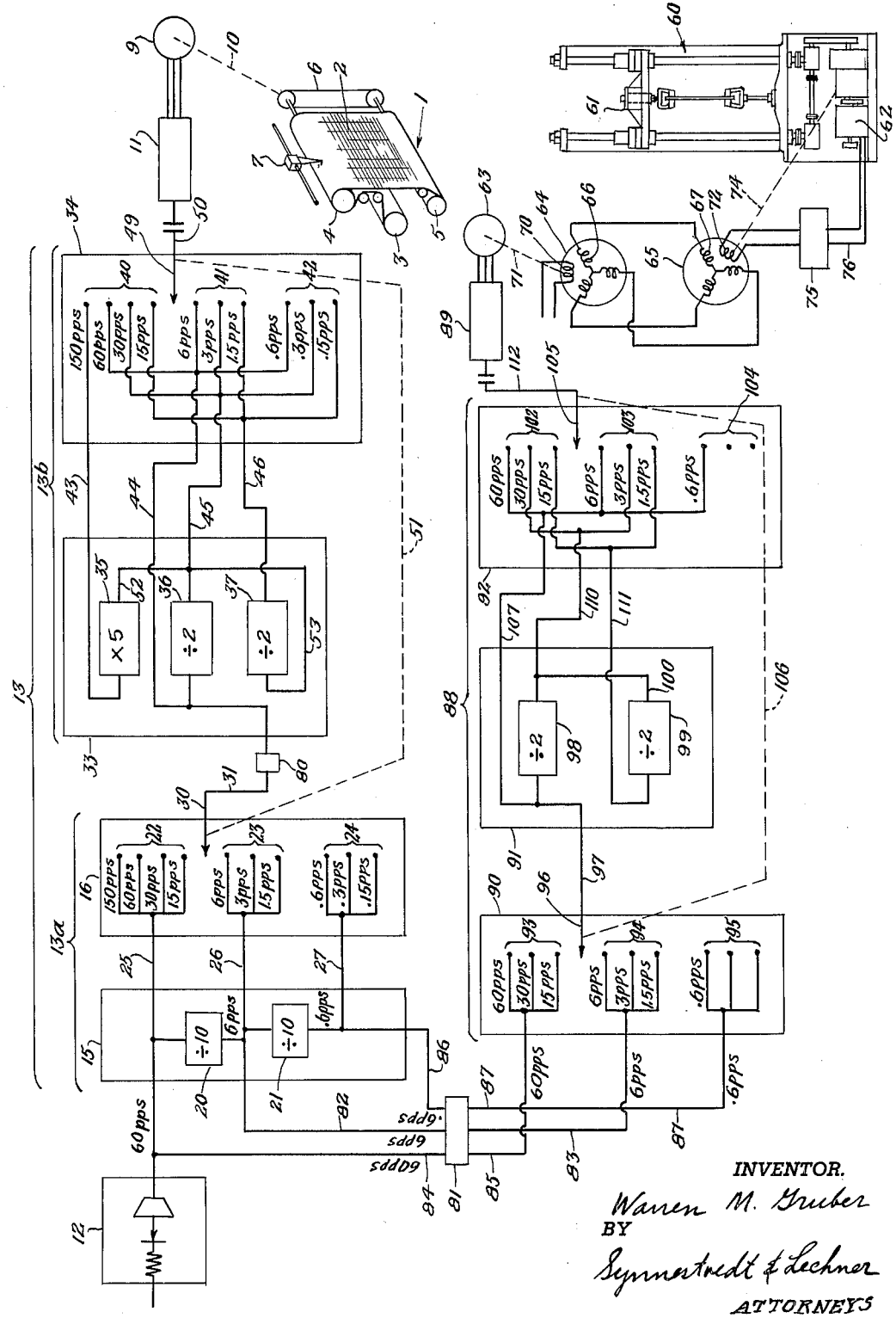

3,245,253
CONTROL MECHANISM FOR UNIVERSAL TESTING MACHINES
Warren M. Gruber, West Rock Hill Township, Bucks County, Pa., assignor to Tinius Olsen Testing Machine Company, Willow Grove, Pa., a corporation of Pennsylvania
Filed Aug. 6, 1963, Ser. No. 300,282
3 Claims. (Cl. 73—91)

This invention relates to materials testing equipment and in particular relates to control mechanism for universal testing machines, for example, machines for testing specimens in compression, tension and the like.

More specifically the invention relates to mechanism for controlling the speed of the loading cross head and the speed of the stress-strain recorder chart either simultaneously or independently.

In testing certain types of materials, it is highly desirable and sometimes necessary for evaluation purposes to run the loading head and/or recorder chart at fixed and certain speeds and further, it is desirable to have a variety of such speeds available for use. In other types of tests, it is not only necessary to have any of a variety of speeds available, but it is desirable that the apparatus be capable of instantaneously shifting from one speed to the other. In the foregoing situations, it is mandatory insofar as accuracy is concerned for the cross head and the recorder chart to be properly synchronized or in step with one another.

Heretofore, there have not been available universal testing machines capable of a wide variety of accurate instantaneously changeable cross head and chart speeds, which when simultaneously moved are accurately synchronized with one another.

The principal purpose of the invention is to provide control mechanism for the loading cross head and recorder chart on a universal testing machine which will meet the long felt needs of speed variety, of instantaneous response and of accurate synchronizing.

A typical embodiment of the invention is described below in connection with FIGURE 1 which is a diagrammatic view of control circuits and portions of a typical testing machine.

In general, the control circuits use well-known and conventional components which are arranged and correlated with one another in a highly novel manner. The invention contemplates the use of digital or numerical techniques and involves the concept that the highly accurate positioning or stepping characteristics of a conventional stepping motor can be utilized as a means for obtaining a highly accurate, and instantaneously responsive rate of speed device. Thus, according to the invention, a conventional stepping motor is operated as a function of the frequency of a supply signal. By applying a signal of higher or lower frequency value, the speed of the motor is correspondingly changed. The rotational speed of the motor then is proportional to the frequency of the signal input. Circuit means are provided to make available several signals, each of different frequency and each corresponding to a desired cross head or chart speed. These can be selectively applied to a stepping motor for the chart and/or the stepping motor for the cross head. A preferred form of the invention is described below.

In FIGURE 1 a conventional stress-strain chart recorder is diagrammatically represented by the numeral 1. The recorder has the chart 2 which is disposed on the chart roll 3, feed roll 4 and rewind roll 5. The rolls 4 and 5 are driven through the gear and pulley system 6. The usual pen 7 is driven across the chart as a function of load. The drive pulley system 6 is driven by the motor 9 through connections indicated by the dotted line 10.

The motor 9 is of conventional stepping motor of the synchronous type having a plurality of field coils on the stator and a slotted permanent magnet rotor. Driving torque is produced as the rotor aligns itself with the field when a stator winding is excited. The stator field is rotated by energizing the coils in a sequence and the rotor steps around with the field. Reversal of the direction of rotation of the rotor is effected by reversing the energizing of the coils. By changing the frequency at which the coils are energized, the rotor is made to move faster or slower. The response of the motor to frequency change and coil energizing reversal is practically instantaneous.

The motor 9 is energized by a conventional translator 11 which converts a periodic signal such as a pulse or square wave into a switching sequence so that the stator coils on the motor 9 are energized at the right time and in the right direction. By changing the frequency of the signal input to the translator, the rotational speed of the motor is changed. The circuit for selecting a particular frequency is described following.

Conventional means for developing a periodic signal, in this instance a square wave, is indicated at 12. The signal developed by the unit 12 is of predetermined and fixed frequency, for example, 60 cycles. The output of the unit 12 is fed to a means 13 which is adapted to develop a plurality of output signals having different frequencies.

Any one of the output signals developed by the means 13 can be fed to the translator 11. The frequency of the signal fed to the translator determines the stepping rate or rotational speed of the motor 9, hence the speed of movement of the chart 2.

The means 13 comprises parts 13a and 13b. The part 13a includes the divider circuit 15 and the selector switch 16. The divider circuit includes the conventional binary coded decimal decade counters 20 and 21 which function as frequency dividers. Depending upon the setting and for a given input frequency, the divider puts out only one signal and this has a fixed and definite frequency. The divider 20 receives the signal from the unit 13 and divides the same by 10 so that the output of the divider 20 is 6 cycles or pulses per second (p.p.s.). The divider 21 receives the output from the divider 20 and further divides this signal by 10 so that the output of the divider 21 is .6 p.p.s.

As will be noted, the selector switch 16 is of the wafer type having three sets of terminals 22, 23 and 24. The set 22 is directly coupled to the output of the unit 12 by the line 25. The set 23 is coupled to the output of the divider 20 by the line 26 and the set 24 is coupled to the output of the divider 21 by the line 27.

As will be observed, when the wiper arm 30 of the selector switch 16 is on any of the terminals of the set 22, the signal frequency appearing on arm 30 is 60 p.p.s. When the wiper arm 30 is connected to any of the terminals of the set 23, the signal frequency on the arm 30 is 6 p.p.s. When the arm 30 is on any of the terminals of the set 24, the signal frequency is .6 p.p.s.

Referring to the sets 22, 23 and 24, it will be noted that each terminal has the letters "p.p.s." together with a coefficient. The coefficients represent the frequency of the signal which will ultimately be applied to the translator 11.

The arm 30 is connected to output line 31 which in turn is connected to part 13b which receives the signal from the line 31 and develops a plurality of output signals. The part 13b comprises the multiplying and dividing unit 33 and the selector switch 34. The unit 33 comprises the multiplier 35 which is adapted to multiply its input signal by 5, together with the dividers 36 and 37, each of which divide its input signal by 2.

The selector switch 34 is of the wafer type having three sets of terminals 40, 41 and 42. The terminals in the sets 40, 41 and 42 are ganged as indicated. The various terminals in the sets 40, 41 and 42 are labeled the same as the terminals in the sets 22, 23 and 24.

The terminal 150 p.p.s. in the set 40 is connected via line 43 to the input of multiplier 35. The terminal 60 p.p.s. in the set 40, the terminal 6 p.p.s. in the set 41 and the terminal .6 p.p.s. in the set 42 are ganged together and connected via line 44 to line 31 and also connected to the input of the divider 36. The terminal 30 p.p.s. in the set 40, the terminal 3 p.p.s. in the set 41 and the terminal .3 p.p.s. in the set 42 are ganged and connected by the line 45 to the output of the divider 36. The terminal 15 p.p.s. in the set 40, the terminal 1.5 p.p.s. in the set 41 and the terminal .15 p.p.s. in the set 42 are ganged together and connected via the line 46 to the output of the divider 37.

The wiper arm 49 on the selector switch 34 is connected to the translator 11 via line 50. The wiper arms 30 and 49 are ganged together (as indicated by the dotted lines 51) so that the wiper arms in each switch occupy corresponding terminals.

By way of illustration, in the organization described above a signal frequency in the table below will cause the chart 2 to run at corresponding linear speeds.

| Pulses per second: | Inches/min. |
| --- | --- |
| 150 | 50 |
| 60 | 20 |
| 30 | 10 |
| 15 | 5 |
| 6 | 2 |
| 3 | 1 |
| 1.5 | .5 |
| .6 | .2 |
| .3 | .1 |
| .15 | .05 |

Suppose it is desired to run the chart speed at a maximum, the mechanism 51 is manipulated to move the wiper arm 30 of the selector switch 16 to the 150 p.p.s. terminal and the arm 49 of the selector switch 34 to the 150 p.p.s. terminal. Under these conditions, it will be seen that the 60 p.p.s. output of the unit 13 appears on the 150 p.p.s. terminal, on the selector switch 16 and on the line 31. This 60 p.p.s. signal is then fed to the input of the divider 36 which produces an output signal having a frequency of 30 p.p.s. This signal is fed via the line 52 to the multiplier 35 which produces a signal having an output of 150 p.p.s. This signal then is transferred via the line 43 to the 150 p.p.s. signal in the selector switch 34 and thence via the line 50 to the translator 11.

Assume that it is desired to move the chart at the lowest speed, the mechanism 51 is manipulated until the wiper arms 30 and 49 of the selector switches 16 and 34 are on the corresponding .15 p.p.s. terminals.

The 60 p.p.s. signal from the unit 13 goes through dividers 20 and 21 and the .6 p.p.s. signal output of the divider 21 appears on the .15 p.p.s. terminal in the selector switch 16. This is fed via the line 31 to the divider 36 which produces an output of .3 p.p.s. and this signal is fed via the line 53 to the input of the divider 37, which produces an output of .15 p.p.s. and this signal is fed via the line 46 to the .15 p.p.s. terminal on the selector switch 34. The arm 49 and line 50 then feed this signal to the translator 11.

As mentioned heretofore, the invention contemplates driving the movable cross head of the machine at any of a plurality of fixed, linear speeds and further contemplates in certain types of testing, driving the cross head at the same linear speed as the chart. The manner in which this is done is explained below.

In the figure I have diagrammatically shown a testing machine 60 which is constructed as described in corresponding U.S. application of Paul H. Lehnig, Serial No. 257,283, filed February 8, 1963. The machine has a movable or loading cross head 61 which is driven by electrical motor 62. The electrical signal fed to the motor 62 is a function of the rotational speed of a stepping motor 63, the speed of which is determined by the frequency of the signal applied thereto.

Between the motor 63 and the motor 62 I have used a means to convert the rotation of the motor 63 into an electrical signal which is proportional to the rotor rotation. This mechanism includes a synchronous transmitter 64 and a synchronous control transformer 65. The stator coils 66 of the transmitter are connected in the usual manner to the stator coils 67 of the control transformer. The rotor 70 of the transmitter is energized from a 60 cycle source and the rotor is mechanically connected to the stepping motor 63 by the connection indicated by the dotted lines 71. The rotor 72 of the control transformer is mechanically coupled to the cross head drive by the mechanical connection 74. The rotor 72 is also electrically connected to an amplifier 75 which is connected to the motor 62 via the lines 76. The foregoing arrangement is a lag system in that the rotation of the transmitter rotor 70 produces an error signal in the control transformer rotor 72 and this error signal drives the motor 62 which in turn rotates the screw (and moves the cross head) until the signal in the rotor 72 is zero. At this time, of course, the rotor 70 and the rotor 72 occupy the same relative angular positions. The system is set up so that the lag is only a small number of degrees and for all practical purposes, the rotor 72 follows the rotor 70 and is practically in phase therewith.

As mentioned, the speed of the stepping motor 63 is controlled by the frequency of the input signal and with the drive as above described, the cross head 61 moves at a speed which is a function of the frequency of the signal applied to the stepping motor 63. Thus, by controlling the frequency of the signal applied to the motor 63, the movement of the cross head is controlled. The mechanism for applying different frequencies to the motor 63 is described below.

When it is desired to move the cross head of the testing machine without moving the chart, the switch 80 is thrown so to cut off the input to the multiplier and divider 33. The switch 81 is thrown so as to connect the lines 82, 83, lines 84–85 and lines 86–87. As shown, the line 82 is connected to the output of the divider 20, the line 84 is connected to the output of unit 12 and the line 86 connected to the output of divider 21. The lines 83, 85 and 87 are connected to a means 88 which is adapted to develop a plurality of output signals, some of which have frequencies which are lower than the frequencies developed in the unit 12 and part 13a. The output signals of the means 88 are fed to the translator 89 controlling the motor 63.

The means 88 comprises the wafer-type selector switch 90, a divider system 91 and a selector switch 92. The selector switch 90 is of the wafer type having terminal sets 93, 94 and 95. A wiper arm 96 is adapted to be moved selectively over the terminals. As shown, the terminals in set 93 are labeled 60 p.p.s., 30 p.p.s., and 15 p.p.s. The terminals in the set 94 are labeled 6 p.p.s., 3 p.p.s. and 1.5 p.p.s. The active terminal in set 95 is labeled .6 p.p.s. The set of terminals 93 is connected to line 85; the set of terminals 94 is connected to the line 83; and the set of terminals 95 is connected to line 87. The arm 96 is connected via line 97 to the divider unit 91.

The unit 91 comprises the dividers 98 and 99. The input side of the divider 98 is connected to the line 97. The output of the divider 98 is connected via the line 100 to the input of the divider 99.

The wafer-type selector switch 92 has sets of terminals 102, 103 and 104. An arm 105 is adapted to be moved selectively over the terminals and the arm 105 is ganged to the arm 96 by the mechanism indicated by the dotted lines 106. In the selector switch 92, the terminals in the set 102 are labeled 60 p.p.s., 30 p.p.s., 15 p.p.s.; the terminals in the set 103 are labeled 6 p.p.s., 3 p.p.s., 1.5 p.p.s. and the active terminal in the set 104 is labeled .6 p.p.s.

In the switch 92 the terminals 60 p.p.s., 6 p.p.s. and .6 p.p.s. are connected together and joined via the line 107 to the line 97. The terminals 30 p.p.s. and 3 p.p.s. are connected together and joined by the line 110 to the output of the divider 98. The terminals 15 p.p.s., and 1.5 p.p.s. are joined and connected via the line 111 to the output of the divider 99. The selector arm 105 of the selector switch 92 is connected via the line 112 to the translator 89.

In the arrangement described a signal frequency in the table below will cause the cross head 61 to run at corresponding linear speeds.

60 p.p.s., 2″/min.; with 10/1 transmission, 20″/min.
30 p.p.s., 1″/min.; with 10/1 transmission, 10″/min.
15 p.p.s., .5″/min.; with 10/1 transmission, 5″/min.
6 p.p.s., .2″/min.
3 p.p.s., .1″/min.
1.5 p.p.s., .05″/min.
.6 p.p.s., .02″/min.

It will be noted that for 60, 30 and 15 p.p.s., two different cross head speeds are available. This is due to the fact that the cross head drive includes a two speed transmission having a 10/1 ratio (which in the above-mentioned application is gear box 23). For the sake of convenience, the receiver rotor 72 can be coupled to the input of the 10/1 transmission (or gear box 23).

If it is desired to run the cross head at .2 inch per minute, the wiper arms 96 and 105 are respectively set up on the terminal 6 p.p.s. The 6 p.p.s. signal from the divider 20 is fed via line 82 to terminal 6 p.p.s. on selector switch 90, through arm 96, line 97, line 107, terminal 6 p.p.s. on selector switch 92, arm 105 and line 112 to translator 89 which then drives the motor 63.

For some other cross head speed, the wiper arms 96 and 105 are appropriately adjustable. As will be noted, the arrangement provides for the chart and cross head speed to be equal in certain instances.

I claim:
1. In a universal testing machine having a movable cross head for loading a specimen to be tested and motor means for moving the movable cross head, together with a stress-strain recorder having a movable chart and chart drive means for supporting and moving the chart, apparatus for controlling the rates of chart and cross head movements:
   first means to develop a periodic signal for predetermined frequency;
   second means including binary coded decimal decade counters connected to receive said periodic signal and develop a plurality of periodic output signals each of a fixed and definite frequency, at least some of the output signals respectively having frequencies lower than said periodic signal, the second means also including selector switch mechanism for selecting the frequency of the signal appearing at the output of the second means;
   a first synchronous motor having a rotor connected to said chart drive means for operating the same, the rotor being made of magnetic material and the rotor being driven by the field of a plurality of stator coils, motion of the rotor being effected by energizing the stator coils in sequence;
   a first translator connected to the stator coils of said motor, the translator receiving said output signals and developing a control signal to energize the stator coils in a sequence to rotate the rotor, the frequency of the control signal applied to the stator coils determining the rotational speed of the rotor;
   means connecting the selector switch mechanism with said translator to transfer said output signal thereto;
   third means including binary coded decimal decade counters to receive at least some of said signals from said first and second means and develop third output signals, at least some of the third output signals respectively having frequencies lower than the output signals of said second means, the third means also including selector switch mechanism for selecting the frequency of the signal appearing at the output of the third means;
   a second synchronous motor having a rotor made of magnetic material, the rotor being driven by the field of a plurality of stator coils, motion of the rotor being effected by energizing the stator coils in sequence;
   a second translator connected to the stator coils of said second motor, the translator receiving said third output signal and developing a control signal to energize the coils in a sequence to rotate the rotor, the frequency of the control signal applied to the stator coils determining the rotational speed of the rotor;
   means connecting the selector switch mechanism with said second translator to transfer said third output signals thereto; and
   mechanism connected to the rotor of said second synchronous motor and to said cross head motor for converting the rotary motion of the rotor to an electrical signal for driving the cross head motor.

2. In a universal testing machine having a movable cross head for loading a specimen to be tested and motor means for moving the movable cross head, together with a stress-strain recorder having a movable chart and chart drive means for supporting and moving the chart, apparatus for controlling the rate of chart movement and for controlling the rate of cross head motion:
   first means to develop a periodic signal of predetermined frequency;
   second means including binary coded decimal decade counters to receive said periodic signal and develop a plurality of first output signals each of a fixed and definite frequency, at least some of the output signals respectively having frequencies lower than said periodic signal, the second means also including a selector switch for selecting the signal appearing at the output of the second means;
   third means including binary coded decimal decade counters connected to receive signals from said selector switch and develop second output signals each of a fixed and definite frequency, at least some of the second output signals respectively having frequencies lower than said first output signals, the third means also including a second selector switch for selecting the signal appearing at the output of the third means;
   a synchronous motor having a rotor connected to said chart drive means for operating the same, the rotor being made of magnetic material and the rotor being driven by the field of a plurality of stator coils, motion of the rotor being effected by energizing the stator coils in sequence;
   a translator connected to the stator coils of said motor, the translator receiving said output signals and developing a control signal to energize the stator coils in a sequence to rotate the rotor, the frequency of the signal applied to the stator coils determining the rotational speed of the rotor;
   means connecting the second selector switch mechanism with said translator to transfer the output signals thereto, said first and second selector switches being ganged and operating to select the signal to be supplied to the translator;

fourth means including binary coded decimal decade counters connected to receive at least some of said signals from said first and second means and develop third output signals each of a fixed and definite frequency, at least some of the third output signals respectively having frequencies lower than the output signals of said second means, the fourth means also including a third selector switch mechanism for selecting the signal appearing at the output of the fourth means;

a second synchronous motor, the motor having a rotor made of magnetic material, the rotor being driven by the field of a plurality of stator coils, motion of the rotor being effected by energizing the stator coils in sequence;

a second translator connected to the stator coils of said second motor, the translator receiving said third output signal and developing a control signal to energize the coils in a sequence to rotate the rotor, the frequency of the control signal applied to the stator coils determining the rotational speed of the rotor; and mechanism connected to the rotor of said second synchronous motor and to said cross head motor for converting the rotary motion of the synchronous motor to an electrical signal for driving the cross head motor.

3. In a universal testing machine having a movable cross head for loading a specimen to be tested and motor means for moving the movable cross head, together with a stress-strain recorder having a movable chart and chart drive means for supporting and moving the chart, apparatus for controlling the rates of chart and cross head movement:

first means to develop a periodic signal of predetermined frequency;

second means including binary coded decimal decade counters connected to receive said periodic signal and develop a plurality of periodic output signals each of a fixed and definite frequency, at least some of the output signals respectively having frequencies different from said periodic signal, the second means also including selector switch mechanism for selecting the frequency of the signal appearing at the output of the second means;

a first motor including rotor means and coil means, the rotor being connected to said chart drive means for operating the same and the rotor being rotated as a function of the energizing of the coil means;

a first translator connected to said coil means, the translator receiving said output signals and developing a control signal to energize the coil means, the frequency of the control signal applied to the coil means determining the rotational speed of the rotor;

means connecting the selector switch mechanism with said translator to transfer said output signal thereto;

third means including binary coded decimal decade counters connected to receive at least some of said signals from said first and second means and develop third output signals, at least some of the third output signals respectively having frequencies different from the output signals of said second means, the third means also including selector switch mechanism for selecting the frequency of the signal appearing at the output of the third means;

a second motor including rotor means and coil means, the rotor being rotated as a function of the frequency of the coil means;

a second translator connected to the coil means of said second motor, the translator receiving said third output signal and developing a control signal to energize the coil means, the frequency of the control signal applied to the coil means determining the rotational speed of the rotor;

means connecting the selector switch mechanism with said second translator to transfer said third output signals thereto; and mechanism connected to the rotor of said second motor and to said cross head motor for converting the rotary motion of the rotor to an electrical signal for driving the cross head motor.

References Cited by the Examiner

UNITED STATES PATENTS

| | | | |
|---|---|---|---|
| 445,476 | 1/1891 | Olsen | 73—93 |
| 2,507,936 | 5/1950 | Schroeder | 318—30 |
| 2,593,493 | 4/1952 | Schlachman et al. | 73—93 |
| 2,945,997 | 7/1960 | Kennedy | 318—171 |
| 3,175,138 | 3/1965 | Kilroy et al. | 318—30 |

RICHARD C. QUEISSER, *Primary Examiner.*

G. M. GRON, *Assistant Examiner.*